United States Patent
Sharma

(10) Patent No.: US 8,719,350 B2
(45) Date of Patent: May 6, 2014

(54) EMAIL ADDRESSEE VERIFICATION

(75) Inventor: Sanjeev Sharma, Ashburn, VA (US)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 12/342,424

(22) Filed: Dec. 23, 2008

(65) Prior Publication Data

US 2010/0161735 A1    Jun. 24, 2010

(51) Int. Cl.
   *G06F 15/16*    (2006.01)
   *G06F 17/30*    (2006.01)

(52) U.S. Cl.
   USPC .......................................... 709/206; 707/899

(58) Field of Classification Search
   USPC ....................... 709/204–206, 217–219; 707/1
   See application file for complete search history.

(56) References Cited

U.S. PATENT DOCUMENTS

| | | | |
|---|---|---|---|
| 6,671,718 B1 | 12/2003 | Meister et al. | |
| 7,181,496 B1 | 2/2007 | Edwards et al. | |
| 7,386,593 B2 | 6/2008 | Arning et al. | |
| 2002/0052873 A1* | 5/2002 | Delgado et al. | 707/7 |
| 2002/0087647 A1* | 7/2002 | Quine et al. | 709/206 |
| 2002/0188690 A1 | 12/2002 | Lee | |
| 2004/0114735 A1* | 6/2004 | Arning et al. | 379/93.24 |
| 2006/0080278 A1* | 4/2006 | Neiditsch et al. | 707/1 |
| 2007/0005708 A1* | 1/2007 | Juliano | 709/206 |
| 2008/0189379 A1* | 8/2008 | Naick et al. | 709/206 |
| 2009/0182818 A1* | 7/2009 | Krywaniuk | 709/206 |
| 2009/0210504 A1* | 8/2009 | Shuster | 709/206 |

* cited by examiner

*Primary Examiner* — Ian N Moore
*Assistant Examiner* — Kiet Tang
(74) *Attorney, Agent, or Firm* — Douglas A. Lashmit; Hoffman Warnick LLC

(57) ABSTRACT

The disclosure is directed to email addressee verification. A method in accordance with an embodiment includes: obtaining an email message including at least one email address; evaluating each email address of the email message against at least one email rule, and assigning a score to each email address based on the evaluation; and comparing the score assigned to each email address to a threshold, and flagging any suspect email address based on the comparison.

14 Claims, 3 Drawing Sheets

EMAIL ADDRESSEE VERIFICATION

FIELD OF THE INVENTION

The present invention relates generally to electronic mail (email), and more particularly, to email addressee verification.

BACKGROUND OF THE INVENTION

As most corporate communication is done via email and more and more sensitive information is being communicated via email, it has become imperative that there be mechanisms in place to ensure that email messages are being addressed to the correct addressee(s). Many email users have received (or sent) email messages not intended for them or have had emails meant for them sent to the wrong person. These instances can result in unwanted consequences ranging from embarrassing personal or private information being shared, to corporate confidential information being disclosed to people not entitled to see it.

This is a crack in corporate security that is easily breached anytime one is sending a sensitive email message to a group of people and does not take the time and care to verify each intended recipient's email address individually. This verification can become extremely cumbersome given the large number of email addressees an email message might be sent to. It is further exasperated in large companies by the existence of multiple employees with same surnames and similar email addresses.

SUMMARY OF THE INVENTION

The present invention is directed to email addressee verification. A rules engine examines the addressee list of all sensitive email messages. The rules engine looks for addressees in the addressee list that appear out of place and marks them "suspect" for manual examination and verification by the sender of the email. The "suspect" status of an addressee can be determined, for example, by examining the email addresses of the addressees as well as other known information against a set of rules. Further, the email addresses can be examined to determine whether all other addressees on the addressee list belong to the "set" created by the addressee list.

An embodiment of the present invention is directed to a method for email addressee verification, comprising: obtaining an email message including at least one email address; evaluating each email address of the email message against at least one email rule, and assigning a score to each email address based on the evaluation; and comparing the score assigned to each email address to a threshold, and flagging any suspect email address based on the comparison.

Another embodiment of the present invention is directed to a system for email addressee verification, comprising: a system for obtaining an email message including at least one email address; a system for evaluating each email address of the email message against at least one email rule, and assigning a score to each email address based on the evaluation; and a system for comparing the score assigned to each email address to a threshold, and flagging any suspect email address based on the comparison.

Another embodiment of the present invention is directed to a computer program product stored on a computer readable medium, which when executed, provides electronic mail (email) addressee verification, the computer readable medium comprising program code for: obtaining an email message including at least one email address; evaluating each email address of the email message against at least one email rule, and assigning a score to each email address based on the evaluation; and comparing the score assigned to each email address to a threshold, and flagging any suspect email address based on the comparison Another embodiment of the present invention is directed to a method for deploying an application for electronic mail (email) addressee verification, comprising: providing a computer infrastructure being operable to: obtain an email message including at least one email address; evaluate each email address of the email message against at least one email rule, and assign a score to each email address based on the evaluation; and compare the score assigned to each email address to a threshold, and flag any suspect email address based on the comparison.

BRIEF DESCRIPTION OF THE DRAWINGS

These and other features will be more readily understood from the following detailed description of the various aspects of the invention taken in conjunction with the accompanying drawings.

DETAILED DESCRIPTION OF THE INVENTION

The present invention provides email addressee verification.

Often, extensive information is stored in corporate "Address Book" and organizational human resources (HR) databases. In accordance with the present invention, such information is used by an email addressee rules engine, based on a set of defined email rules, to identify addressees who should not be on the addressee list of an email message.

Figure 1:
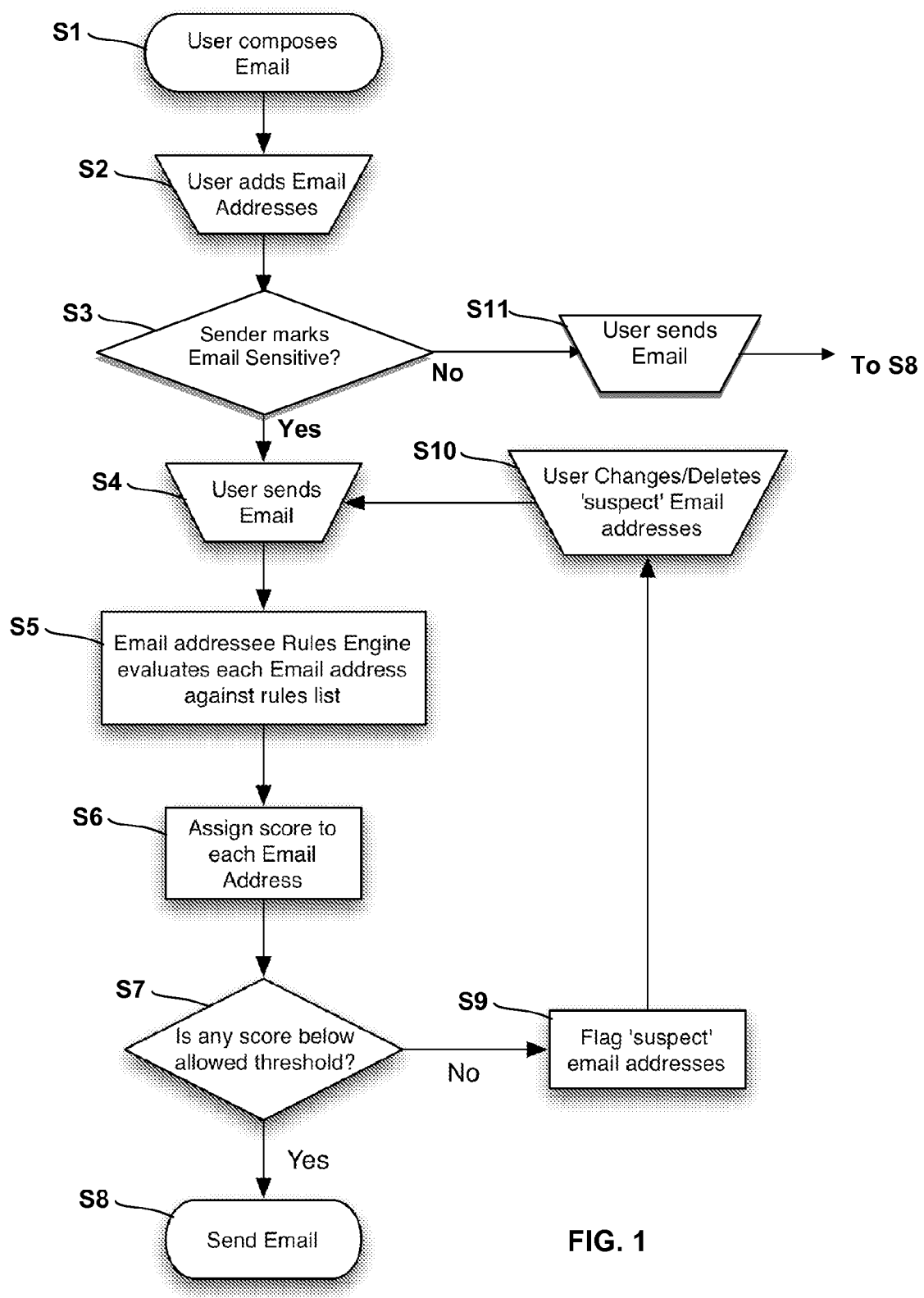
FIG. 1 depicts a flow diagram of an illustrative process for email addressee verification in accordance with an embodiment of the present invention.

A flow diagram of an illustrative process in accordance with an embodiment of the present invention is depicted in FIG. 1. At S1, a user composes an email message in an email client. At S2, the user adds email addresses to the "To" field (and optionally the "Cc" and/or "Bcc" fields) of the email message, thereby generating an addressee list. At S3, if the user does not mark the email message as "sensitive" (No, S3), flow passes to S11, at which the email message is sent in a normal manner to each addressee on the addressee list. If the user does mark the email message as "sensitive" (Yes, S3), flow passes to S4. At S4, the user initiates the sending of the email message (e.g., by actuating a "Send" command via a button or menu).

At S5, the email addressee rules engine of the present invention evaluates the email address of each addressee of the email message against a set of defined email rules. At S6, based on the evaluation, the email addressee rules engine assigns a score to each email address. At S7, the score assigned to each email address by the email addressee rules engine is compared to a threshold. The threshold can be defined, for example, by the sender of the email, automatically based on predetermined criteria (e.g., corporate security requirements), or in any other suitable manner. The threshold can be fixed or variable, depending on the specific application of the present invention, requirements of the user, security requirements, etc.

If the score assigned to each of the addressees of the email message is below the established threshold (YES, S7), the email message is sent at S8. If, however, the score assigned to any of the addressees of the email message is above the established threshold, indicating a "suspect" email address (NO, S7), each "suspect" email address is flagged by the email addressee rules engine at S9. Flow then passes to S10, at which the user can evaluate each flagged email address of the email and change, delete, or approve each of the "suspect" email addresses. The flagged email addresses may be presented to the user using any suitable process, such as in a list, etc.

The type of score assigned to each of the addressees of the email message is application specific. For example, the score can be a simple "pass" or "fail", depending on whether a given addressee fails to comply to any, all, a predetermined set (one or more), a predetermined percentage (>75%), etc., of the email rules. In another example, some or all of the email rules can be assigned weights based, for example, on importance, to provide a weighted score, wherein compliance with a given email rule reduces the score applied to an addressee, while non-compliance with the email rule increases the score applied to an addressee. In yet another example, some or all of the email rules can be assigned a fixed value, based on compliance, to provide an aggregate score. For instance, compliance with a given email may result in a score of "0", while non-compliance with the email rule may result in a score of "1". The score may also be a percentage of the email rules an email addressee complies with (e.g., 75% of email rules). The above examples are not intended to be limiting: many other implementations and/or combinations thereof are possible and are within the purview of one skilled in the art.

The threshold to which the score assigned to each of the addressees of the email message is compared is also application specific. For example, a lower threshold may be desired in the case where addressee accuracy is more important, while a higher threshold may be desired in the case where addressee accuracy is less important. The type of threshold used is based on the type of score assigned to each of the addressees of the email message. Again, the above examples are not intended to be limiting: many other implementations and/or combinations thereof are possible and are within the purview of one skilled in the art. Further, at S7, depending on the type of threshold used, a decision of whether a score is below the threshold, rather than above, can be used. In general, any suitable scoring methodology and associated threshold can be used in the practice of the present invention.

Figure 2:
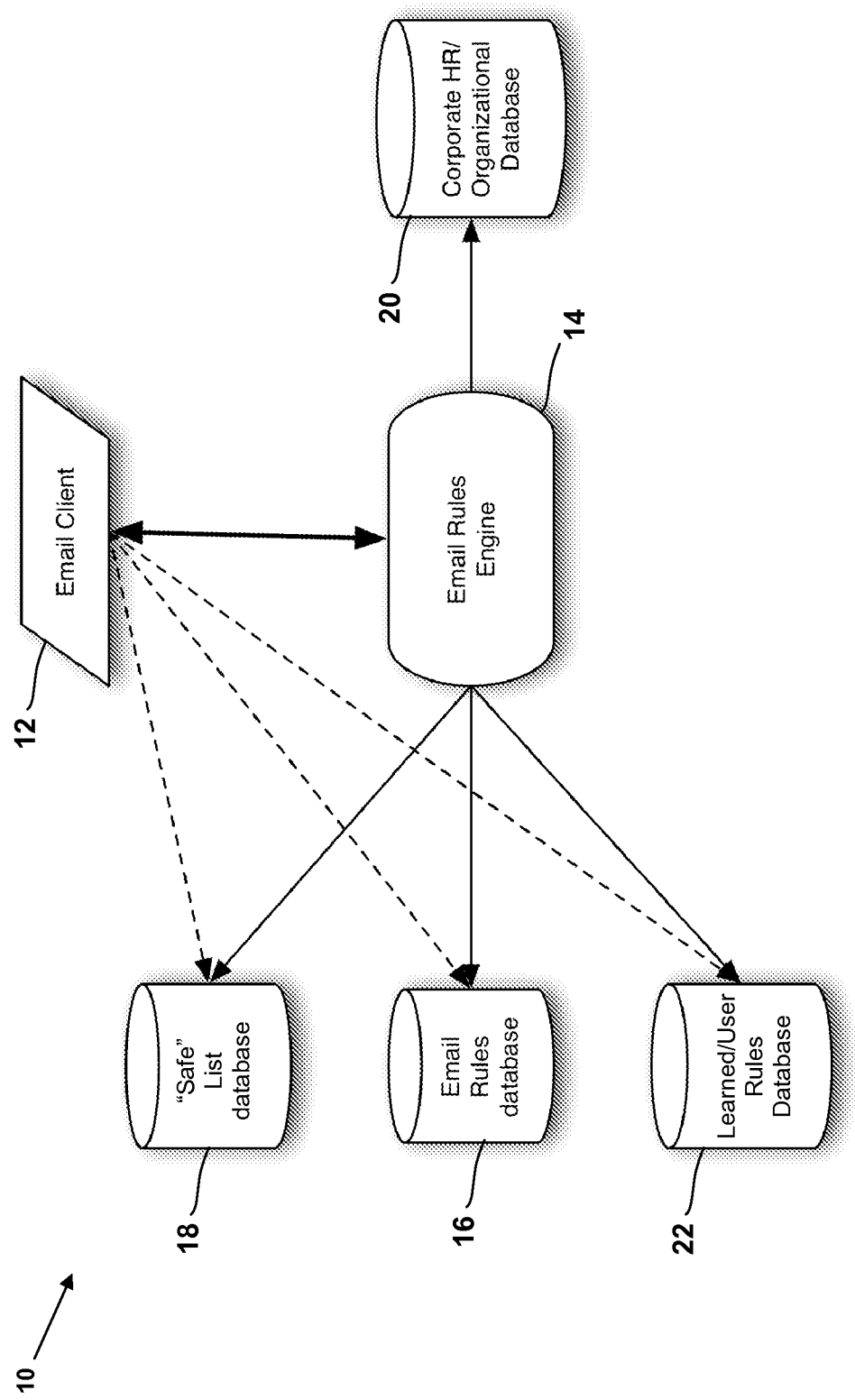
FIG. 2 depicts an illustrative architecture of a system for email addressee verification in accordance with an embodiment of the present invention.

An illustrative architecture of a system 10 in accordance with an embodiment of the present invention is depicted in FIG. 2. In this example, the system 10 comprises and email client 12, an email addressee rules engine 14, an email rules database 16, a "safe" list database 18 (e.g., user and/or corporate defined), a corporate HR/organizational database 20, and a learned/user rules database 22. In general, the email client 12, email addressee rules engine 14, and email rules database 16 interact as described above with regard to FIG. 1.

The rules in the email rules database 16 can include, but are not limited to, the following categories: general rules; rules based on corporate HR and organizational rules; leaned rules; and user defined rules. Each of these categories will be described in greater detail below.

General Rules

General rules may comprise, for example, those rules that are common to all users of a corporate email system or other defined group of email users. General rules can be defined, for example, by a mail administrator or a user who has permission to set rules for a given group. Examples of general rules:

A) Email address of an addressee is in an internal domain(s) (e.g., name@abc.com, where "abc.com" is an internal domain. A list of internal domains may be provided in the "safe" list database 18.
B) Email address of an addressee is in a trusted domain(s). A list of trusted domains may be provided in the "safe" list database 18.

Rules Based on Corporate HR and Organizational Information

Many corporations have internal organizational and address book type applications and databases. These applications/databases often contain information related to the organizational relationships between the employees of a corporation. This information, which can be stored, for example, in the corporate HR/organizational database 20 depicted in FIG. 2, can be used to formulate rules that can identify addressees who are not organizationally related to the sender or to other addressees of an email message. This information can also be used to find addressees who are below a certain management level compared to other addressees. These addressees are more likely to not be intended recipients of a sensitive email. Examples of rules based on corporate HR and organizational information:

A) Rules based on corporate position. For example, if all the other addressees are managers or executives, are there any addressees who are not?
B) Is an addressee a contractor?
C) Does an addressee have the same management chain as the sender of the email, the sender's peers on their management chain, or other addressees?
D) Does an addressee have the same business unit/division/geography as the sender or other addressees?
E) Does an addressee appear strange compared to other addressees (e.g., an addressee does not belong to the organization of any other addressee)?
F) Is an addressee of the same profession as other addressees, such as engineer, architect, project manager, consultant, etc.?

Learned Rules

Rules based on intelligence gathered by the email client 12 by capturing past behaviors and patterns. For example, if an email addressee set or subset has been used in the past in a sent email, it is likely that the email addressee set or subset does not contain any "suspect" email addresses. Further, if an addressee has previously been rejected/flagged as "suspect", it is likely that the addressee will again be flagged as "suspect". Such learned rules may be stored in the learned/user rules database 22.

User Defined Rules

User defined rules, which may be stored in the learned/user rules database 22, are defined individually by each user, based on their needs for rules beyond what the email addressee rules engine 14 may apply otherwise. Determining if an addressee is in a "safe" list defined by the user is an example of a user defined rule.

Figure 3:
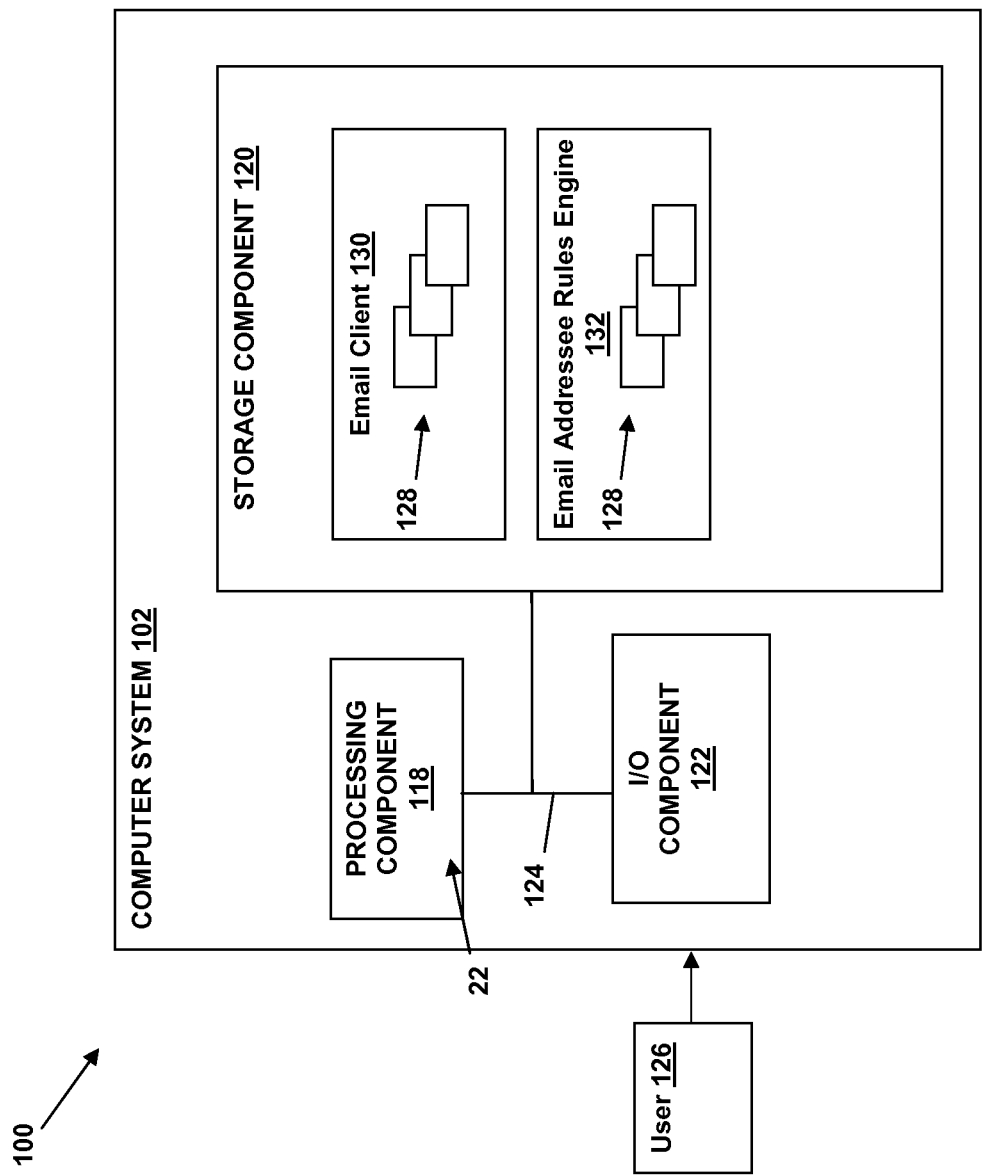
FIG. 3 depicts an illustrative environment for implementing the present invention.

FIG. 3 shows an illustrative environment 100 for email addressee verification in accordance with any/all embodiments of the disclosure. To this extent, environment 100 includes a computer system 102 that can perform the processes described herein.

The computer system 102 is shown including a processing component 118 (e.g., one or more processors), a storage component 120 (e.g., a storage hierarchy), an input/output (I/O) component 122 (e.g., one or more I/O interfaces and/or devices), and a communications pathway 124. In general, the processing component 118 executes program code, such as email client 130 and email addressee rules engine 132, which are at least partially stored in storage component 120, and which enable the computer system 102 to verify email addressees by performing the above-described process steps of the invention. While executing program code, the processing component 118 can read and/or write data to/from the storage component 120 and/or the I/O component 122. The communication pathway 124 provides a communications link between each of the components in computer system 102. The I/O component 122 can comprise one or more human I/O devices, which enable a human user 126 to interact with the computer system 102, and/or one or more communications devices to enable other computer system(s) to communicate with the computer system 102 using any type of communications link.

The computer system 102 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the email client 130 and email addressee rules engine 132 can be embodied as any combination of system software and/or application software. Further, the email client 130 and email addressee rules engine 132 can each be implemented using a set of modules 128. In this case, a module 128 can comprise a component that performs a set of actions used by the email client 130 and email addressee rules engine 132. Further, it is understood that some of the actions discussed herein may not be implemented or additional actions may be implemented by computer system 102.

When the computer system 102 comprises multiple computing devices, each computing device can have only a portion of the email client 130 and email addressee rules engine 132 installed thereon (e.g., one or more modules 128). However, it is understood that the computer system 102 is only representative of various possible equivalent computer systems that may implement the process described herein. To this extent, in other embodiments, the actions implemented by the computer system 102 can be at least partially implemented by one or more computing devices that include any combination of general and/or specific purpose hardware and/or program code. In each embodiment, the program code and hardware can be provided using standard programming and engineering techniques, respectively.

When the computer system 102 includes multiple computing devices, the computing devices can communicate over any type of communications link. Further, while performing the process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

It is understood that each of the process flows shown and described herein are only illustrative. To this extent, numerous variations of these process flows are possible, and are included within the scope of this disclosure. Illustrative variations include performing one or more processes in parallel and/or a different order, performing additional processes, not performing some processes, and/or the like. To this extent, multiple tasks/threads/processes can be used to perform the actions of the processes described herein.

It is further understood that aspects of the invention further provide various alternative embodiments. For example, in one embodiment, the invention provides a computer program stored on at least one computer-readable medium, which when executed, enables a computer system to perform the processes described above. To this extent, the computer-readable medium can include program code for implementing some or all of the process described herein. It is understood that the term "computer-readable medium" comprises one or more of any type of tangible medium of expression capable of embodying a copy of the program code (e.g., a physical embodiment). For example, the computer-readable medium can comprise: one or more portable storage articles of manufacture; one or more memory/storage components of a computing device; a modulated data signal having one or more of its characteristics set and/or changed in such a manner as to encode information in the signal; paper; and/or the like.

In another embodiment, a computer system, such as the computer system 102, can be obtained (e.g., provided, created, maintained, made available, etc.) and one or more programs/systems for performing the process described herein can be obtained (e.g., provided, created, purchased, used, modified, etc.) and deployed to the computer system. To this extent, the deployment can comprise one or more of: (1) installing program code on a computing device from a computer-readable medium; (2) adding one or more computing devices to the computer system; and (3) incorporating and/or modifying the computer system to enable it to perform the process described herein.

Aspects of the invention can be also implemented as part of a business method that performs the process described herein on a subscription, advertising, and/or fee basis. That is, a service provider could offer to provide some/all of the components/processes needed to provide status-based filtered email alerts, as described herein. In this case, the service provider can manage (e.g., create, maintain, support, etc.) some or all of the environment 100, such as the computer system 102, that performs the process described herein for one or more customers. In return, the service provider can receive payment from the customer(s) under a subscription and/or fee agreement, receive payment from the sale of advertising to one or more third parties, and/or the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the inven-

What is claimed is:

1. A method for electronic mail (email) addressee verification, comprising:
   obtaining an email message including a plurality of email addresses;
   evaluating each email address of the email message against a database of suspect email addresses and a plurality of email rules,
   wherein at least one of the plurality of email rules includes an organizational rule, the organizational rule including determining if each email address in the plurality of email addresses has the same management chain as a sender of the email,
   wherein the evaluating is performed prior to the email message being sent, and
   wherein the evaluating includes determining if any of the email addresses in the plurality of email addresses are below a certain management level relative to other email addresses in the plurality of email addresses;
   assigning a score to each email address based on the evaluation,
   wherein the score assigned to each email address is related to a percentage of the plurality of email rules that each respective email address complies with;
   comparing the score assigned to each email address to an application specific threshold;
   flagging any suspect email address based on the comparison,
   wherein the flagging includes marking any suspect email address for evaluation by a user; and
   storing a suspect email address in the database of suspect email addresses.

2. The method of claim 1, wherein the evaluating further comprises:
   determining if the email message is marked as sensitive; and
   performing the evaluating if the email message is marked as sensitive.

3. The method of claim 2, wherein a sender of the email message marks the email message as sensitive.

4. The method of claim 1, further comprising:
   providing each flagged suspect email address to a sender of the email message, wherein at least one email rule includes a user defined rule.

5. The method of claim 1, wherein at least one email rule includes a general rule.

6. The method of claim 1, further comprising:
   sending the email message to all of the email addresses of the email message if none of the email addresses is flagged as suspect, wherein at least one email rule includes a learned rule.

7. A computer system comprising:
   at least one computing device configured to verify electronic mail (email) addressees, the at least one computing device including:
   a system for obtaining an email message including a plurality of email addresses;
   a system for evaluating each email address of the email message against a database of suspect email addresses and a plurality of email rules, and assigning a score to each email address based on the evaluation,
   wherein at least one of the plurality of email rules includes an organizational rule, the organizational rule including determining if each email address in the plurality of email addresses has the same management chain as a sender of the email,
   wherein the evaluating is performed prior to the email message being sent and the score assigned to each email address is related to a percentage of the plurality of email rules that each respective email address complies with, and
   wherein the plurality of email rules includes a corporate position rule configured to determine if any of the email addresses in the plurality of email addresses are below a certain management level relative to other email addresses in the plurality of email addresses;
   a system for comparing the score assigned to each email address to an application specific threshold;
   a system for flagging any suspect email address based on the comparison,
   wherein the flagging includes marking any suspect email address for evaluation by a user; and
   a system for storing a suspect email address in the database of suspect email addresses.

8. The system of claim 7, wherein the system for evaluating further comprises:
   a system for determining if the email message is marked as sensitive; and
   a system for performing the evaluating if the email message is marked as sensitive.

9. The system of claim 8, wherein a sender of the email message marks the email message as sensitive.

10. The system of claim 7, further comprising:
    a system for providing each flagged suspect email address to a sender of the email message, wherein the email rule includes a user defined rule.

11. The system of claim 7, wherein at least one email rule includes a general rule.

12. The system of claim 7, further comprising:
    a system for sending the email message to all of the email addresses of the email message if none of the email addresses is flagged as suspect, wherein at least one email rule includes a learned rule.

13. A computer program product stored on a non-transitory computer readable medium, which when executed, provides electronic mail (email) addressee verification, the computer readable medium comprising program code for:
    obtaining an email message including at least one email address;
    evaluating each email address of the email message against a database of suspect email addresses and a plurality of email rules,
    wherein the evaluating is performed prior to the email message being sent, and
    wherein the plurality of email rules include an organizational rule which determines if an addressee has the same management chain as a sender of the email;
    assigning a score to each email address based on the evaluation,
    wherein the score assigned to each email address is related to a percentage of the plurality of email rules that each respective email address complies with;
    comparing the score assigned to each email address to an application specific threshold;
    flagging any suspect email address based on the comparison,
    wherein the flagging includes marking any suspect email address for evaluation by a user; and
    storing a suspect email address in the database of suspect email addresses.

14. A method for deploying an application for electronic mail (email) addressee verification, comprising:
provide a computer infrastructure being operable to:
obtain an email message including at least one email address;
evaluate each email address of the email message against a database of suspect email addresses and a plurality of email rules,
wherein the evaluating is performed prior to the email message being sent, and
wherein the plurality of email rules include an organizational rule which determines if an addressee has the same management chain as a sender of the email;
assign a score to each email address based on the evaluation,
wherein the score assigned to each email address is related to a percentage of the plurality of email rules that each respective email address complies with;
compare the score assigned to each email address to an application specific threshold;
flag any suspect email address based on the comparison,
wherein the flagging includes marking any suspect email address for evaluation by a user; and
store a suspect email address in the database of suspect email addresses.

\* \* \* \* \*